United States Patent
McCauley et al.

(10) Patent No.: US 9,233,881 B2
(45) Date of Patent: Jan. 12, 2016

(54) CERAMIC BODY FORMING BATCH MATERIALS COMPRISING SILICA METHODS USING THE SAME AND CERAMIC BODIES MADE THEREFROM

(71) Applicant: CORNING INCORPORATED, Corning, NY (US)

(72) Inventors: Daniel Edward McCauley, Horseheads, NY (US); Anthony Nicholas Rodbourn, Avoca, NY (US); Patrick David Tepesch, Corning, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/276,359

(22) Filed: May 13, 2014

(65) Prior Publication Data
US 2014/0249020 A1    Sep. 4, 2014

Related U.S. Application Data

(62) Division of application No. 13/873,546, filed on Apr. 30, 2013, now Pat. No. 8,759,240, which is a division of application No. 13/036,289, filed on Feb. 28, 2011, now Pat. No. 8,450,227.

(51) Int. Cl.
*C04B 38/06* (2006.01)
*C04B 38/00* (2006.01)
*C04B 35/195* (2006.01)
*C04B 35/478* (2006.01)
*C04B 35/10* (2006.01)

(52) U.S. Cl.
CPC ............ *C04B 38/0675* (2013.01); *C04B 35/10* (2013.01); *C04B 35/195* (2013.01); *C04B 35/478* (2013.01); *C04B 38/0074* (2013.01); *C04B 38/066* (2013.01); *C04B 38/068* (2013.01); *C04B 2235/3208* (2013.01); *C04B 2235/3213* (2013.01); *C04B 2235/3217* (2013.01); *C04B 2235/3227* (2013.01); *C04B 2235/3232* (2013.01); *C04B 2235/3418* (2013.01); *C04B 2235/422* (2013.01); *C04B 2235/5436* (2013.01); *C04B 2235/5463* (2013.01); *C04B 2235/5481* (2013.01); *C04B 2235/96* (2013.01)

(58) Field of Classification Search
CPC .............. C04B 38/068; C04B 38/0675; C04B 38/0074
See application file for complete search history.

(56) References Cited

U.S. PATENT DOCUMENTS

| | | | |
|---|---|---|---|
| 6,773,481 B2 | 8/2004 | Noguchi et al. | 55/523 |
| 7,250,384 B2 | 7/2007 | Morimoto et al. | 501/119 |
| 7,259,120 B2 | 8/2007 | Ellison et al. | 501/134 |
| 7,309,371 B2 | 12/2007 | Merkel et al. | 55/523 |
| 7,473,464 B2 | 1/2009 | Morimoto et al. | 423/305.5 |
| 7,691,319 B2 | 4/2010 | Inoue | 264/630 |
| 7,744,670 B2 | 6/2010 | Miao et al. | 55/523 |
| 2006/0140878 A1 | 6/2006 | Cornelius et al. | 424/49 |
| 2009/0143221 A1 | 6/2009 | Ogunwumi et al. | 502/67 |
| 2011/0152075 A1 | 6/2011 | Raffy et al. | 502/439 |

FOREIGN PATENT DOCUMENTS

| | | |
|---|---|---|
| EP | 1 997 788 | 12/2008 |
| EP | 2 228 115 | 9/2010 |
| WO | 2006/130759 | 12/2006 |
| WO | 2010/001066 | 1/2010 |
| WO | 2010/099369 | 9/2010 |
| WO | 2011/066125 | 6/2011 |

*Primary Examiner* — Karl Group
(74) *Attorney, Agent, or Firm* — Joseph M. Homa

(57) ABSTRACT

The disclosure relates to ceramic-body-forming batch materials comprising at least one pore former and inorganic batch components comprising at least one silica source having a specified particle size distribution, methods of making ceramic bodies using the same, and ceramic bodies made in accordance with said methods. The disclosure additionally relates to methods for reducing pore size variability in ceramic bodies and/or reducing process variability in making ceramic bodies.

9 Claims, 2 Drawing Sheets

CERAMIC BODY FORMING BATCH MATERIALS COMPRISING SILICA METHODS USING THE SAME AND CERAMIC BODIES MADE THEREFROM

CROSS-REFERENCE TO RELATED APPLICATIONS

This application is a Divisional of, and claims benefit to, U.S. application Ser. No. 13/873,546, filed Apr. 30, 2013, now U.S. Pat. No. 8,759,240 and U.S. application Ser. No. 13/036,289, filed Feb. 28, 2011, now U.S. Pat. No. 8,450,227, the contents of which are incorporated herein in their entireties.

FIELD OF THE DISCLOSURE

Disclosed herein are ceramic-body-forming batch materials comprising at least one pore former and inorganic batch components comprising at least one silica source having a specified particle size distribution. The disclosure further relates to methods of making ceramic bodies, said methods comprising, in part, forming a batch material comprising at least one pore former and inorganic batch components comprising at least one silica source having a specified particle size distribution and ceramic bodies made in accordance with said methods. The disclosure additionally relates to methods for reducing pore size variability in ceramic bodies and/or reducing process variability in making ceramic bodies.

BACKGROUND

Ceramic bodies, such as aluminum titanate and cordierite ceramics, may be used in a variety of applications. For example, such bodies are viable for use in the severe conditions of exhaust gas environments, including, for example as catalytic converters and as diesel particulate filters. Among the many pollutants in the exhaust gases filtered in these applications are, for example, hydrocarbons and oxygen-containing compounds, the latter including, for example, nitrogen oxides (NOx) and carbon monoxide (CO), and carbon based soot and particulate matter.

Ceramic bodies exhibit high thermal shock resistance, enabling them to endure the wide temperature variations encountered in their application, and they also exhibit other advantageous properties for diesel particulate filter applications, such as, for example, high porosity, low coefficient of thermal expansion (CTE), resistance to ash reaction, and a modulus of rupture (MOR) adequate for the intended application.

With engine management schemes becoming more and more sophisticated, and with catalyst compositions ever changing, there exists a need for the ability to vary or tailor the properties of these ceramic bodies, for example their pore size, porosity, pore size distribution, and microstructure. Moreover, there is a need for methods to make ceramic bodies having these desirable properties. Additionally, there is a need for methods to reduce pore size variability in ceramic bodies and/or reduce process variability in making ceramic bodies.

While pore formers may be selected to produce a range of porosity and/or pore size in a ceramic body based on their shape and size, they may be expensive and can make extrusion and drying difficult, including often requiring complicated firing cycles to burn out the pore former without cracking the underlying parts.

The inventors have now discovered novel ceramic-body-forming batch materials, ceramic bodies, and methods of making the same that may allow for the ability to vary or tailor the properties of these ceramic bodies, for example their pore size, porosity, pore size distribution, and microstructure.

SUMMARY

In accordance with the detailed description and various exemplary embodiments described herein, the disclosure relates to novel ceramic-body-forming batch materials comprising (a) at least one pore former, and (b) inorganic batch components comprising at least one silica source having a specified particle size distribution. In various embodiments, the silica source may have a particle size distribution with an $sD_{breadth}$ (i.e. $(sd_{90}-sd_{10})/sd_{50}$) of about 2 or less and a median particle size ($sd_{50}$) ranging from about 5 µm to 240 µm.

The disclosure further related to methods of making ceramic bodies, said methods comprising forming a batch material comprising at least one pore former and inorganic batch components comprising at least one silica source; forming a green body from said batch material; and firing the green body to obtain the ceramic body. In various embodiments, the silica source may have a particle size distribution with an $sD_{breadth}$ of about 2 or less and a median particle size ($sd_{50}$) ranging from about 5 µm to 240 µm. The disclosure also relates to ceramic bodies made in accordance with these methods.

The disclosure also relates to methods for reducing pore size variability in ceramic bodies and/or reducing process variability in making ceramic bodies, the method comprising, in part, reducing the variability in the particle size distribution of a first lot of a silica source which comprises an inorganic batch component in a first batch relative to a second lot of a silica source which comprises an inorganic batch component in a second batch. In various embodiments the first lot silica source has a particle size distribution with an $sD_{breadth}$ of about 2 or less, and a median particle size ($sd_{50}$) ranging from about 5 µm to 240 µm. Additionally, in further embodiments, the median particle size ($sd_{50}$) of the silica source may vary by about ±4 µm or less, the $sd_{10}$ may vary by about ±0.5 µm or less, and the $sd_{90}$ may vary by about ±10 µm or less.

BRIEF DESCRIPTION OF THE DRAWINGS

The accompanying drawings are included to provide a further understanding of the invention as claimed and are incorporated in and constitute a part of this specification. The drawings are not intended to be restrictive, but rather illustrate exemplary embodiments and, together with the description, serve to explain the principles of the invention as claimed.

DETAILED DESCRIPTION

Figure 1:
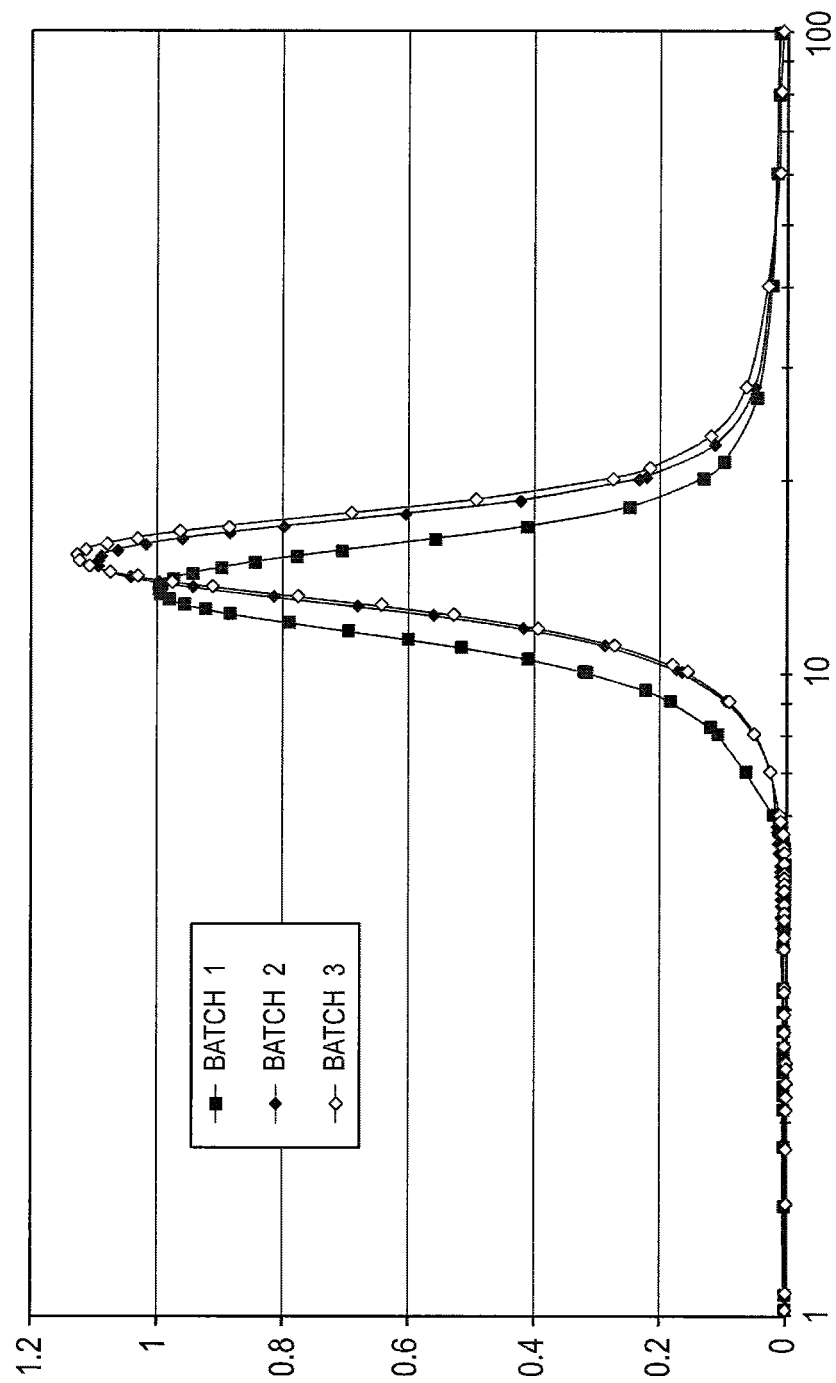
FIG. 1 depicts the properties of ceramic bodies obtained according to one embodiment as described in Example 1.

It is to be understood that both the foregoing general description and the following detailed description are exemplary and explanatory only, and are not restrictive of the claimed invention. Other embodiments will be apparent to those skilled in the art from consideration of the specification disclosed herein. It is intended that the specification and examples be considered as exemplary only.

As used herein, the use of "the," "a," or "an" means "at least one," and should not be limited to "only one" unless explicitly indicated to the contrary. Thus, for example, the use of "the silica source" or "a silica source" is intended to mean "at least one silica source."

The disclosure relates to ceramic-body-forming batch materials comprising at least one pore former, and inorganic batch components comprising at least one silica source.

As used herein, the terms "ceramic-body-forming batch material," "batch material," and variations thereof, are intended to mean a substantially homogeneous mixture comprising (a) at least one pore former and (b) inorganic batch components. The batch material of the present disclosure may be used to make ceramic bodies, including, but are not limited to, those comprised of cordierite, aluminum titanate composites, mullite, alkali and alkaline-earth feldspar phases, and silicon carbide.

The inorganic batch components comprise at least one silica source. Sources of silica include, but are not limited to, non-crystalline silica, such as fused silica or sol-gel silica, colloidal silica, silicone resin, low-alumina substantially alkali-free zeolite, diatomaceous silica, and crystalline silica, such as quartz or cristobalite. Additionally, the sources of silica may include silica-forming sources that comprise a compound that forms free silica when heated, for example, silicic acid or a silicon organometallic compound.

In various embodiments, the silica source may have a median particle size ($sd_{50}$) ranging from about 5 μm to 240 μm, for example from about 5 μm to 50 μm, 10 μm to 40 μm or from about 15 μm to 35 μm.

In various embodiments, the silica source may have a particle size distribution with an $sD_{breadth}$ (i.e. $(sd_{90}-sd_{10})/sd_{50}$) of about 2 or less, for example about 1.7 or less, or 1.4 or less.

It is within the ability of one skilled in the art to select the amount of silica source such that the desired ceramic body may be formed. In various exemplary embodiments, the silica source may comprise from about 5 wt % to about 60 wt % of the inorganic batch material on an oxide basis, such as about 5 wt % to about 20 wt %, or about 8 wt % to about 12 wt %.

In further embodiments, the inorganic components may further comprise components for forming various ceramic bodies, including, but not limited to, at least one alumina source, at least one titania source, at least one magnesium source; at least one strontium source, and at least one calcium source. In various embodiments, the inorganic components may be chosen such that the batch material may form at least one of silicon carbide, aluminum titanate composite, mullite, alkali feldspar phases, or cordierite ceramic body. In at least one embodiment, the batch material may form an aluminum titanate composite or cordierite ceramic body.

The ceramic-forming-batch material of the disclosure further comprises a pore former. As used herein, the terms "pore former," "pore-forming material," and variations thereof, mean materials selected from the group comprising: carbon (e.g., graphite (natural or synthetic), activated carbon, petroleum coke, and carbon black), starch (e.g., corn, barley, bean, potato, rice, tapioca, pea, sago palm, wheat, canna, and walnut shell flour), and polymers (e.g., polybutylene, polymethylpentene, polyethylene (preferably beads), polypropylene (preferably beads), polystyrene, polyamides (nylons), epoxies, ABS, Acrylics, and polyesters (PET)). In at least one embodiment, the pore former may be chosen from starches. By way of example only, the pore former may be a starch chosen from potato and pea starch.

Non-limiting examples of pore formers include Native Potato Starch marketed by Emsland Starke GmbH from Kyrita and Emlichheim, Germany facilities and Native Pea Starch marketed by Emsland Starke GmbH from the Emlichheim, Germany facility.

In various exemplary embodiments, one of skill in the art may choose the pore former such that the median particle size ($pd_{50}$) may range from about 1 μm to 400 μm, such as, for example, from about 5 μm to 300 μm, from about 5 μm to 200 μm, from about 5 μm to 100, or from about 5 μm to 60 μm.

In various embodiments of the disclosure, the pore former may have a median particle size ($pd_{50}$), wherein the ratio of $sd_{50}$ to $pd_{50}$ is in the range of from about 0.6 to about 1.5, such as, for example from about 0.8 to 1.3.

In various embodiments of the disclosure, selecting a pore former and silica source within these ranges may result in ceramic bodies having more narrow pore size distribution and/or enhanced physical properties (e.g., strength, pressure drop, and coefficient of thermal expansion (CTE)) than ceramic bodies made with components outside the scope of this ratio.

In various exemplary embodiments, the pore former may be chosen to be present in any amount to achieve a desired result. For example, the pore former may comprise at least 1 wt % of the batch material, added as a super-addition (i.e., the inorganic components comprise 100% of the batch material, such that the total batch material is 101%). For example, the pore former may comprise at least 5 wt %, at least 10 wt %, at least 15 wt %, at least 20 wt %, at least 30 wt %, at least 40 wt %, or at least 50 wt % of the batch material, added as a super-addition. In further embodiments, the pore former may comprise less than 20 wt % of the batch material as a super-addition.

In various embodiments of the disclosure, the batch material may be mixed with any other known component useful for making batch material. For example, the batch material may further comprise at least one organic binder. In such an embodiment, it is within the ability of one skilled in the art to select an appropriate binder. By way of example only, an organic binder may be chosen from cellulose-containing components, such as, for example, methylcellulose, methylcellulose derivatives, and combinations thereof.

It is also within the ability of one skilled in the art to select an appropriate solvent, if desired. In various exemplary embodiments, the solvent may be water, for example deionized water.

In additional exemplary embodiments, the batch material may be mixed with any other known component useful for making batch material, such as, for example, at least one lubricant.

The disclosure further relates to methods of making a ceramic body using batch materials of the disclosure, wherein said methods may comprise: preparing a batch material; forming a green body from said batch material; and firing the green body to obtain a ceramic body.

The ceramic-body-forming batch material may be prepared by any method known to those of skill in the art. By way of example, in at least one embodiment, the inorganic components may be combined as powdered materials and intimately mixed to form a substantially homogeneous mixture. The pore former may be added to form a batch mixture before or after the inorganic components are intimately mixed. In various embodiments, the pore former and inorganic components may then be intimately mixed to form a substantially homogeneous batch material. It is within the ability of one of skill in the art to determine the appropriate steps and conditions for combing the inorganic materials and pore former to achieve a substantially homogeneous batch material.

The additional components, such as lubricant, organic binder, and solvent, may be mixed with the batch material individually, in any order, or together to form a substantially homogeneous mixture. It is within the ability of one of skill in the art to determine the appropriate conditions for mixing the batch material with the additional components, such as organic binder and solvent, to achieve a substantially homogeneous material. For example, the components may be mixed by a kneading process to form a substantially homogeneous mixture.

The mixture may, in various embodiments, be formed into a ceramic body by any process known to those of skill in the art. By way of example, the mixture may be injection molded or extruded and optionally dried by conventional methods known to those of skill in the art to form a green body.

In various exemplary embodiments, the green body may then be fired to form a ceramic body. It is within the ability of one skilled in the art to determine the appropriate method and conditions for firing a ceramic body, such as, for example, firing conditions including equipment, temperature, and duration, to achieve a ceramic body, depending in part upon the size and composition of the green body.

The disclosure further relates to the ceramic bodies made in accordance with the methods of the disclosure. In various exemplary embodiments, the ceramic body may be a silicon carbide, aluminum titanate composite, or cordierite ceramic body.

In at least one embodiment, the ceramic bodies may have a porosity in the range of from about 40% to about 70%, for example about 40% to 60%, or 40% to 50%.

In further embodiments, the ceramic bodies may have a pore size distribution with a $D_{breadth}$ (i.e. $(d_{90}-d_{10})/d_{50}$) less than about 0.70 for example less than about 0.60, less than about 0.50, less than about 0.45, such as less than about 0.41.

The disclosure also relates to methods for reducing pore size variability in ceramic bodies and/or reducing process variability in making ceramic bodies. As used herein, the term "reducing pore size variability," and variations thereof, is intended to mean that relative to a control or standard ceramic body, there is less variation in pore size parameters (median pore size ($d_{50}$) and/or pore size distribution as characterized by the $D_{breadth}$ or $D_{factor}$) of a ceramic body made in accordance with the inventive method as compared to the variation in pore size characteristics of a ceramic body not made in accordance with the inventive method. As used herein, the term "reducing process variability," and variations thereof, is intended to mean that relative to specification or control process parameters, such as firing cycles, there is less variation in process parameters for the methods of the disclosure as compared to methods outside the scope of the disclosure.

In various embodiments, these methods comprise reducing the variability in the particle size distribution of at least one silica source comprising an inorganic batch component. As used herein, the term "reducing the variability in the particle size distribution" is intended to mean that various particle size parameters characterizing the material vary less from the standard or specifications for that material than is conventionally used. For example, in various embodiments of the disclosure, the median particle size of the silica source ($sd_{50}$) may vary by about ±4 μm or less, such as about ±2 μm or less or about ±1 μm or less. In other embodiments, the particle size $sd_{10}$ of the silica source may vary by about ±0.5 μm or less, such as about ±0.25 μm or less or about ±0.125 μm or less. And, in other embodiments, the particle size $sd_{90}$ of the silica source may vary by about ±10 μm or less, such as about ±5 μm or less or about ±2.5 μm or less.

The silica source for use in these methods is the same as that described above. For example, in various embodiments, the silica source may have a particle size distribution with an $sD_{breadth}$ of about 2 or less, and a median particle size ($sd_{50}$) ranging from about 5 μm to 240 μm.

In various embodiments, the ceramic body made in accordance with this method may be an aluminum titanate composite ceramic body or a cordierite ceramic body.

When fired, the silica source reacts into the matrix, leaving holes or pores in the ceramic body. The shape and size of these holes may be identical to the shape and size of the silica particles that created them.

By carefully selecting the particle size distribution of the silica source, one may tailor the properties of the ceramic body, e.g., pore size distribution, and/or improve properties. In various embodiments, selecting a silica source with a narrow particle size distribution may result in a ceramic body with increased strength and a reduced coefficient of thermal expansion. In other embodiments, reducing the fine silica particles in the silica source, e.g., increasing the particle size $sd_{10}$, may reduce shrinkage variability. In other embodiments, reducing the large silica particles in the silica source, e.g., decreasing the particle size $sd_{90}$, may improve filtration efficiency of the resulting ceramic body.

Unless otherwise indicated, all numbers used in the specification and claims are to be understood as being modified in all instances by the term "about," whether or not so stated. It should also be understood that the precise numerical values used in the specification and claims form additional embodiments. Efforts have been made to ensure the accuracy of the numerical values disclosed in the Examples. Any measured numerical value, however, can inherently contain certain errors resulting from the standard deviation found in its respective measuring technique.

Other embodiments will be apparent to those skilled in the art from consideration of the specification. It is intended that the specification and examples be considered as exemplary only, with a true scope and spirit of the invention being indicated by the claims.

EXAMPLES

Example 1

Figure 2:
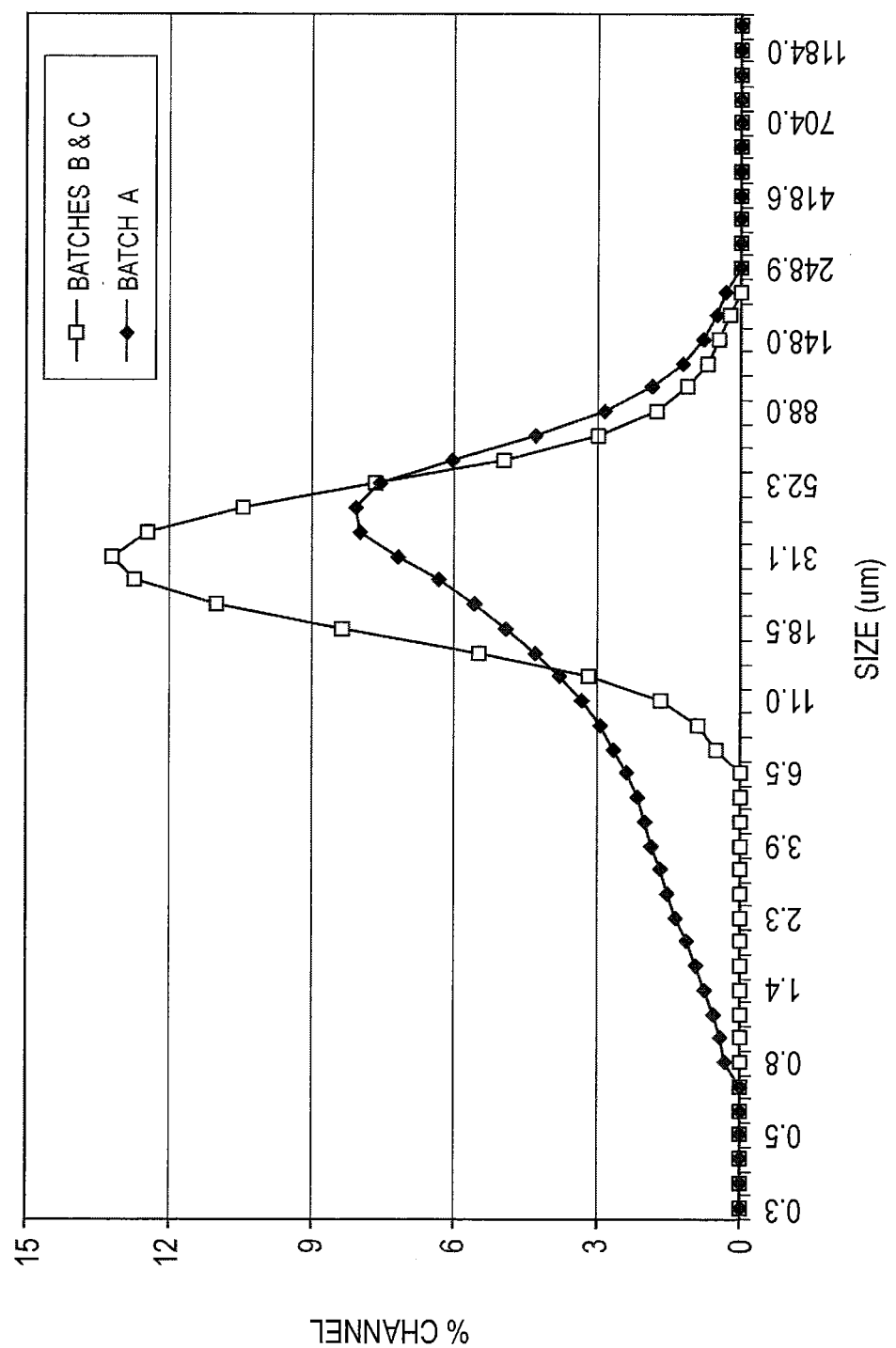
FIG. 2 depicts the particle size distribution of silica sources described in Examples 1 and 2.

Three aluminum titanate composite ceramic bodies were prepared using the same batch materials and amounts, but for the use of two different silica sources. Specifically, batch A was prepared using inorganic materials comprising 49.67 wt % alumina, 30.33 wt % titania, 10.31 wt % silica "A" (comparative), 8.10 wt % strontium carbonate, 1.39 wt % calcium carbonate, and 0.20 wt % lanthanum oxide. Batches B and C were prepared using the same materials and amounts but for the use of a different silica source, silica "B". Particle size data for the two silica sources are set forth in Table 1 below. Additionally, FIG. 2 also shows the particle size distribution for the two silica sources used in the batches.

For both batches, the inorganic materials were combined with one another in powder form. Then pore-forming materials (3.50 wt % 4566 graphite and 9.0 wt % pea starch, as super-additions) were added to the inorganic materials and intimately mixed to produce a substantially homogeneous mixture.

Methylcellulose, which comprised 4.5 wt % of the mixtures as a super-addition, was added as a powder to the batch materials. Then water, which comprised 16 wt % of the mixture as a super-addition, was added to form a wet mixture.

The plasticized mixtures were extruded to make cellular ware (e.g., 300 cells per square inch (cpsi)/10 mil web thickness), and the resulting green bodies were fired on a standard alumina titanate firing schedule as described in International Publication No. WO 2006/130759, which is incorporated herein by reference.

The resulting alumina titanate composite ceramic bodies were analyzed. Their properties are set forth in Table 2 below. Additionally, FIG. 1 is a plot of pore size diameter (μm) on the x-axis versus log differential intrusion (ml/g) on the y-axis.

As seen in Table 2 and FIG. 1, the ceramic body formed from Batch A, which is not within the scope of the disclosure, has a greater $D_{breadth}$, i.e., a greater percentage of fine pores, than the bodies formed from Batches B and C, which are within the scope of the disclosure. Thus, the ceramic bodies formed from Batches B and C may exhibit improved filtration efficiency.

Batch A has higher coefficients of thermal expansion at 800° C. and 1000 than Batches B and C, indicating that Batches B and C have less shrinkage. Additionally, Batch A has a lower modulus of rupture, than Batches B and C, indicating that Batches B and C result in stronger ceramic bodies.

TABLE 1

Particle Sizes of Silica Sources

| Type | sd10 (μm) | sd50 (μm) | sd90 (μm) |
|---|---|---|---|
| A | 4 | 25 | 63 |
| B | 15 | 29 | 57 |

TABLE 2

Properties of Ceramic Bodies (Batches A-C)

| | Properties of Ceramic Body | | | | | | | |
|---|---|---|---|---|---|---|---|---|
| Batch | Porosity | d50 (μm) | d10 (μm) | d90 (μm) | $D_{breadth}$ | CTE (at 800° C.) | CTE (at 1000° C.) | MOR (psi) |
| A | 45.34 | 13.72 | 9.51 | 20.64 | 0.81 | 0.9 | 5.4 | 201 |
| B | 45.49 | 14.92 | 10.80 | 19.67 | 0.59 | −0.5 | 4.1 | 227 |
| C | 45.10 | 15.20 | 11.33 | 21.32 | 0.66 | −1.1 | 4.4 | 222 |

Example 2

Batch material for making aluminum titanate composite ceramic bodies was prepared. Specifically, the batch was prepared using inorganic materials comprising 59.11 wt % alumina, 30.66 wt % titania, 8.27 wt % silica "B", 1.96 wt % yittrium oxide. Particle size data for the silica source is set forth in Table 1 above.

The inorganic materials were combined with one another in powder form. Then pore-forming material (12.0 wt % pea starch, as a super-addition) was added to the inorganic materials and intimately mixed to produce a substantially homogeneous mixture.

Methylcellulose, which comprised 4.5 wt % of the mixture as a super-addition, was added as a powder to the batch materials. Then water, which comprised 14 wt % of the mixture as a super-addition, was added to form a wet mixture.

The plasticized mixture was extruded to make cellular ware (e.g., 300 cells per square inch (cpsi)/14 mil web thickness). Three resulting green bodies were fired in an electric kiln in air and at a 60° C./hour heating rate to 1400° C., 1420° C., and 1440° C., for samples D, E, and F, respectively, with a 16 hour hold time. The bodies were then cooled at 300° C./hour.

The resulting alumina titanate composite ceramic bodies were analyzed. Their properties are set forth in Table 3 below.

As seen in Table 3, the ceramic bodies have a low $D_{factor}$ and $D_{breadth}$ i.e., a narrow range of pore size and low percentage of fine pores. Thus, the ceramic bodies may exhibit good improved filtration efficiency.

Additionally, the batches have low coefficients of thermal expansion at 1000° C., indicating that they have low shrinkage.

TABLE 3

Properties of Ceramic Bodies (Samples D-F)

| | Properties of Ceramic Body | | | | | |
|---|---|---|---|---|---|---|
| Sample | Porosity (%) | d50 (μm) | d10 (μm) | d90 (μm) | $D_{breadth}$ | $D_{factor}$ | CTE (at 1000° C.) |
| D | 41.7 | 10.5 | 7.9 | 12.6 | 0.45 | 0.25 | 3.9 |
| E | 41.2 | 10.9 | 8.3 | 12.7 | 0.41 | 0.23 | 2.7 |
| F | 40.3 | 11.3 | 8.7 | 13.5 | 0.42 | 0.23 | 1.1 |

What is claimed:

1. A method of making a ceramic body, said method comprising:
    preparing a batch material comprising:
        at least one pore former, and
        inorganic batch components comprising:
            (i) at least one silica source; and
            (ii) at least one source chosen from alumina sources, titania sources, magnesium sources, strontium sources, and calcium sources;
    forming a green body from said batch material; and
    firing the green body to obtain a ceramic body;
    wherein the at least one silica source has a particle size distribution with an $sD_{breadth}$ of about 2 or less, and a median particle size ($sd_{50}$) ranging from about 5 μm to 240 μm.

2. The method of claim 1, wherein the particle size distribution $sD_{breadth}$ of the at least one silica source is about 1.7 or less.

3. The method of claim 1, wherein the median particle size ($sd_{50}$) of the at least one silica source ranges from about 5 μm to 50 μm.

4. The method of claim 1, wherein the particle size distribution $sD_{breadth}$ of the at least one silica source is about 1.4 or less.

5. The method of claim 1, wherein the median particle size ($sd_{50}$) of the at least one silica source ranges from about 10 μm to 40 μm.

6. The method of claim 1, wherein the median particle size ($sd_{50}$) of the at least one silica source ranges from about 15 μm to 35 μm.

7. The method of claim 1, wherein said at least one pore former has a median particle size ($pd_{50}$), and the ratio of $sd_{50}$ to $pd_{50}$ is in the range of from about 0.6 to about 1.5.

8. The method of claim 1, wherein said at least one pore former has a median particle size ($pd_{50}$), and the ratio of $sd_{50}$ to $pd_{50}$ is in the range of from about 0.8 to about 1.3.

9. The method of claim 1, wherein the inorganic batch components are chosen so as to form an aluminum titanate composite ceramic-body-forming batch material or a cordierite ceramic-body-forming batch material.

* * * * *